United States Patent [19]

Sychra et al.

[11] Patent Number: 5,759,259
[45] Date of Patent: Jun. 2, 1998

[54] AIR ENTRAINING AGENT FOR CONCRETE AND MORTAR MIXTURES

[75] Inventors: Marcel Sychra, Krems; Harald Steindl, Hollenburg, both of Austria

[73] Assignee: Krems Chemie Aktiengesellschaft, Krems, Austria

[21] Appl. No.: 702,458

[22] PCT Filed: Mar. 30, 1995

[86] PCT No.: PCT/AT95/00065

§ 371 Date: Sep. 26, 1996

§ 102(e) Date: Sep. 26, 1996

[87] PCT Pub. No.: WO95/26936

PCT Pub. Date: Oct. 12, 1996

[30] Foreign Application Priority Data

Mar. 31, 1994 [AT] Austria ..................... 687/94

[51] Int. Cl.$^6$ ................................. C04B 24/34
[52] U.S. Cl. .................. 106/659; 106/696; 106/727; 106/808; 106/822
[58] Field of Search ............... 106/659, 819, 106/823, 696, 724, 727, 730, 820, 822, 728, 821, 808, 810

[56] References Cited

U.S. PATENT DOCUMENTS

| | | | |
|---|---|---|---|
| 2,510,776 | 6/1950 | Gabrielson | 106/659 |
| 4,019,916 | 4/1977 | Golightly et al. | |
| 4,046,582 | 9/1977 | Kawamura et al. | 106/678 |
| 4,249,948 | 2/1981 | Okada et al. | |
| 4,453,978 | 6/1984 | Okimura et al. | |
| 4,948,429 | 8/1990 | Arfaei | 106/659 |
| 5,156,679 | 10/1992 | Gartner et al. | 106/823 |
| 5,522,927 | 6/1996 | Hegge | 106/724 |

FOREIGN PATENT DOCUMENTS

| | | |
|---|---|---|
| 0054175 | 6/1982 | European Pat. Off. |
| 0150754 | 8/1985 | European Pat. Off. |
| 291901 | 7/1991 | German Dem. Rep. |
| 290329 | 5/1991 | Germany |
| 56-022665 | 3/1981 | Japan |
| 57-166352 | 10/1982 | Japan |
| 358015057 | 1/1983 | Japan ........................ 106/659 |
| 58-1057 | 1/1983 | Japan |
| 629-185 | 5/1977 | U.S.S.R. |
| 800-157 | 8/1978 | U.S.S.R. |
| 1730082 | 4/1992 | U.S.S.R. |

OTHER PUBLICATIONS

"Gum rosin Salt Air Entraining Hydraulic Cement Admixture . . . " Jeknavorian US Open App. No. 09503688W Published Oct. 12, 1995.

*Primary Examiner*—Paul Marcantoni
*Attorney, Agent, or Firm*—Spencer & Frank

[57] ABSTRACT

An air entraining agent based on rosin for a composition which contains cement and which is one of mortar or concrete includes at least one rosin salt which is a reaction product of materials including rosin and from 0.5 to 50 weight % of amino alcohol; and alkali which is at least one material selected from the group consisting essentially of sodium hydroxide, potassium hydroxide, and sodium carbonate, which functions at least as a pH adjusting agent and is present in amounts effective to provide a preselected alkaline pH, and which is optionally included in the materials which form said reaction product, wherein the rosin is at least one rosin selected from the group consisting essentially of gum rosin, modified gum rosin, tall oil rosin, and wood rosin, wherein the amino alcohol is at least one amino alcohol selected from the group consisting essentially of ethanol amine, diethanol amine, triethanol amine, dimethyl ethanol amine, methyl diethanol amine, tri-n-propanol amine, triisopropanol amine, isobutyl diethanol amine, and n-butyl diethanol amine, and functions to prevent ester and amide formation, and wherein the air entraining agent has a form selected from the group comprising a solid, an aqueous solution, an aqueous colloidal suspension, and an aqueous dispersion.

18 Claims, No Drawings

AIR ENTRAINING AGENT FOR CONCRETE AND MORTAR MIXTURES

BACKGROUND OF THE INVENTION

Many concrete buildings and concrete structures are exposed to constant stress due to environmental influences. For example, cement concrete road surfaces are subjected to frequent changes between frosts and thaws during winter, and possibly an additional effect of chemical thawing agents that can lead to premature destruction of the concrete. This is also the case for concrete buildings or parts thereof, which are subjected to similar conditions, for example in the air-placed-concrete regions of road surfaces or in hydraulic structures. Concrete can be damaged or destroyed by frequent changes between frosts and thaws if its pores are filled with water to the extent that the concrete has a critical degree of saturation. The mechanisms that cause this type of damage are only partially understood. Because of the influence of surface forces in the fine capillary pores of the cement stone, as well as the lowering of the freezing point due to dissolved substances in the pore water, the water in the cement stone does not yet freeze at 0° C. Instead, the proportion of freezable water increases steadily as the temperature continues to drop. Hydrostatic pressures in the water that has not yet frozen, which are triggered by the increase in the volume of the frozen water, as well as osmotic pressures and a redistribution of the water in the pore system of the cement stone can lead to such high internal tensions that the concrete is destroyed. However, concrete buildings and structures can be produced to have a high resistance to frost if a sufficient expansion space is created through the artificial introduction of finely-distributed air pores. These finely-distributed air pores can be introduced artificially by the addition of suitable substances that create defined expansion spaces in the hardening mixture to concrete and mortar mixtures; for their part, these expansion spaces reduce or prevent damaging tensions caused by freezing water. A wide variety of substances has been proposed for this purpose, such as:

1. organic, surface-active substances,
2. substances that produce gas pores or gas bubbles in the not-yet-set concrete by triggering a chemical reaction,
3. solid substances that are preformed and/or granulated in foam form from plastics or inorganic materials, or mixtures of these materials.

All of these methods have known disadvantages, and cannot be used in every application. In particular, the method described under 1) has been used in numerous cases because of the extraordinary simplicity and good reproducibility of the metering of the surfactant. Examples of these air entraining agents include alkali salts from resin acids, sulphonated resin acids, alkali sulphonates, alkyl sulphonates, alkylarenesulphonates, fatty acid salts, etc.

The surface-active substances used range from anion-active to non-ionic to cation-active substances, as described in, for example, EP 0 054 175, U.S. Pat. Nos. 4,019,916, 4,249,948, 4,453,978 or SU 629 185.

The aforementioned resin acids or their derivatives were used especially frequently as air entraining agents. For example, the use of a wood rosin called "Vinsol" is generally regarded as prior art, and "Vinsol Resin" is also accepted as a standard in ASTM Specification C-226-86, "Air Entraining Additions for Use in the Manufacture of Air Entraining Portland Cement" and is cited by name.

Moreover, a wide range of other modified resins or their soaps are known which act as air entraining agents. The use of a resin modified with an adduct of ethylene oxide laurylamine as an air entraining agent is known from JP 58 01057.

An air entraining agent based on a tall resin methylolized with paraformaldehyde is described in DD 291901.

Another method, as described in SU 800 157, provides that, prior to being saponified, the resin acids used are subjected to a thermal oxidation, the result of which is a dimeric product.

JP 57 166352 describes the use of a colophony as an air entraining agent, the resin having been reinforced with maleic anhydride and esterified with polyethylene glycol and subsequently saponified with KOH.

The proportion and quality (pore diameter, spacing factor) of the air pores entrained in the concrete, as well as the stability of the air entraining system, are determined by the quality of the selected air entraining agent and its concentration. Clearly, an industrially-applicable air entraining agent must be able to be stored in its aqueous solutions. Different air pore quantities cannot be introduced over a consumption period during which the volume metering is the same. The air entraining agent cannot precipitate out of its solutions as a solid substance, or, in the case of precipitation, it must form a sufficiently stable, colloidal solution that assures a constant substance metering and entraining of air pores, for example into the tempering water. This quality criterion was not always reliably met in the aforementioned resins or modified resins, especially in the use of hard or very hard water.

The object of the invention is to develop an air entraining agent that is stable even in hard water, and is highly effective.

SUMMARY OF THE INVENTION

In accordance with the invention, this is accomplished in that the air entraining agent is a salt of a colophony (i.e., rosin) containing an amino alcohol and alkali, and is present in the form of a solid substance, an aqueous solution, a colloidal, aqueous solution (suspension) or an aqueous dispersion.

Ethanol amine, diethanol amine, triethanol amine, dimethyl ethanol amine, methyl diethanol amine, tri-n-propanol amine, triisopropanol amine, isobutyl diethanol amine, n-butyl diethanol amine or mixtures thereof are preferably present as a salt-forming amino alcohol in the air entraining agent of the invention; NaOH, KOH or sodium carbonate is preferred as an alkali.

Modified and/or non-modified gum rosin, tall oil rosin or wood rosin and/or mixtures thereof are preferably used as a colophony. Modified rosins can be reinforced and/or disproportionated. Reinforced refers to the standard Diels-Alder adduct formation reaction of colophonies having α, β-unsaturated carbonyl compounds, such as fumaric acid, maleic acid, maleic anhydride, itaconic acid, itaconic acid anhydride, acrylic acid, methyl-acrylic acid, etc., under the conditions that are typical for this reaction. Disproportionation involves the stabilization of the rosins by means of conversion of abietic acid, neoabietic acid and Palustrin acid into dehydroabietic acid, dihydroabietic acid and tetrahydroabietic acid due to the effect of high temperature and/or suitable catalysts, such as Pd/C, Ni/C, Pt/C, iodine, organic iodine derivatives, organic sulfur derivatives, etc. (see also D. F. Zinkel and J. Russel, Naval Stores—Production, Chemistry, Utilization; Pulp Chemical Association; 1989, pp. 262-298).

The above-described methods for modifying colophonies are generally known, and are characterized as prior art for modifying colophonies for a large number of applications such as paper-sizing means, adhesives, varnish raw materials, etc.

Surprisingly, it was found that the colloidal, dispersed or completely-dissolved colophony-derivative air entraining agents of the invention not only yield significantly more stable aqueous solutions or dispersions than the standard air entraining agent "Vinsol," but are also much more effective as air entraining agents, including the solid colophony derivatives of the invention.

The essential feature of the present invention is that the modified or non-modified colophony is present as a salt containing one or a plurality of amino alcohols and possibly alkali such as NaOH or KOH; amino alcohol is added such that no ester or amide formation can occur between the colophony or modified colophony and the amino alcohol or amino alcohol mixture. The quantity of necessary amino alcohol or amino alcohol mixture in the air entraining agents of the invention is advisably between 0.5 and 50 percent by weight, particularly 3 to 30 percent by weight.

The reinforcement of the colophony or disproportionated colophony or mixtures thereof with $\alpha, \beta$-unsaturated carbonyl compounds can be performed in a standard manner at 160° to 300° C., particularly at 200° to 250° C., over a period of 1 to 5 hours, with the necessary quantity of the $\alpha, \beta$-unsaturated carbonyl compound being between 1 and 30 percent by weight, particularly between 5 and 25 percent by weight.

The disproportionation of colophony, modified colophony or mixtures thereof can be performed with 5% Pd on activated charcoal at temperatures of 180° to 280° C. under $N_2$ over 1 to 24 hours, particularly 2 to 10 hours.

The air entraining agents of the invention can be added directly to the cement, or added to the cement mass with the tempering water as a dispersion, a colloidal solution or a completely saponified solution. The latter metering method is preferred because it is simple, highly precise and reproducible. The air entraining agent of the invention is advisably added in a quantity of 0.001 to 0.1% with respect to the cement.

DESCRIPTION OF THE PREFERRED EMBODIMENTS

The invention is described in detail below in conjunction with examples. The properties of the air entraining agents of the invention are compared to the air entraining agent Vinsol of the prior art.

EXAMPLE 1

4 kg gum rosin were melted under $N_2$; 0.8 kg fumaric acid is added; the reaction temperature was increased to 250° C. and maintained there for 5 hours, and finally decreased to 150° C. The gum rosin reinforced in this manner had an acid value of 270 mg KOH/g and a softening temperature of 130° C. After rapid addition of 1.5 kg triethanol amine, the salt solution was pH adjusted with a 20% NaOH solution to a pH of 10.5 and subsequently diluted with tap water to have a solids content of 30%. This clear, stable stock solution was then diluted with 25° dH hard water to have a 4% solids content.

EXAMPLE 2

1 kg of the rosin reinforced with fumaric acid according to Example 1 was reduced in size to have a particle size <50 μm (assessment with microscope). The rosin powder obtained in this manner was stirred vigorously in 1 l tap water to form a suspension, 0.3 kg triethanol amine was added, the pH adjusted set with 20% NaOh at a pH of 10.5 and subsequently diluted with tap water to have a solids content of 30%. This clear, stable stock solution was then diluted with 25° dH hard water to have a 4% solids content.

EXAMPLE 3

0.9 kg of the rosin reinforced with fumaric acid according to Example 1 was reduced in size and with a mixture of 1.2 kg sodium carbonate and 0.06 kg triethanol amine, to have a particle size <50 μm. The rosin powder obtained in this manner was dissolved with in water and diluted to a solids content of 30%. This clear, stable stock solution was then diluted with 25° dH hard water to have a 4% solids content.

EXAMPLE 4

5 kg tall oil rosin was disproportionated with 0.01 kg of a 5% Pd/C catalyst K-0227 (Hereaus Co.) for 10 hours at 230° C. under $N_2$ to have an abietic acid content of less than 15%; the catalyst was filtered out, and the rosin was reinforced with 0.1 kg maleic anhydride for 3 hours at 250° C. and subsequently cooled to 150° C. The rosin obtained in this manner had an acid value of 195 mg KOH/g and a softening temperature of 90° C. After rapid addition of 1.2 kg diethanol amine, the salt, solution was pH adjusted with 20% KOH solution, to a pH of 11 and subsequently diluted with tap water to have a solids content of 30%. This clear, stable stock solution was then diluted with 25° dH hard water to have a 4% solids content.

EXAMPLE 5

The 30% and 4% solutions or dispersions produced in accordance with Examples 1 through 4 were tested regarding their long-term stability as a solution or dispersion, and their suitability as concrete air entraining agents. The results were compared with those of the Vinsol resin (Hercules Corp.), with the 30% or 4% Vinsol solution being prepared according to the methods outlined in Examples 1 through 4. The testing to assess whether the Vinsol resin and the substances produced according to Examples 1 through 4 were suitable as initial materials for creating air entraining systems was performed according to the technical guidelines of the Austrian Society for Traffic and Roads RVS Jan. 8, 1971.

The examination results are summarized in Table 1.

TABLE 1

| Product According to Example No. | Material Content (% absolutely dry]) to Cement | Air Pores (%) | Distance Factor for Spherical Pores (mm) | Average Pore Diameter (mm) | Storage Stability after 6 Weeks 30% | 4% |
|---|---|---|---|---|---|---|
| 1 | 0.015 | 6.5 | | | good | good |
| 1 | 0.0075 | 5.4 | | | | |
| 1 | 0.0036 | 4.7 | 0.1 | 0.1 | | |
| 2 | 0.0036 | 4.3 | 0.09 | 0.1 | good | good |
| 3 | 0.0036 | 4.0 | 0.1 | 0.1 | good | good |
| 4 | 0.009 | 6.4 | 0.08 | 0.11 | good | good |
| 4 | 0.0045 | 3.9 | 0.11 | 0.11 | | |
| Vinsol | 0.03 | 6.8 | 0.12 | 0.1 | fixed | good |
| Vinsol | 0.015 | 3.3 | 0.13 | 0.12 | | |

What is claimed is:

1. An air entraining agent based on rosin for a composition which contains cement and which is one of mortar or concrete, the air entraning agent comprising:
   at least one rosin salt which is a reaction product of materials including rosin and from 0.5 to 50 weight % of amino alcohol; and alkali which is at least one material selected from the group consisting of sodium hydroxide, potassium hydroxide, and sodium carbonate, which functions at least as a pH adjusting agent and is present in amounts effective to provide an alkaline pH, and which is optionally included in the materials which form said reaction product, wherein the rosin is at least one rosin selected from the group consisting of gum rosin, modified gum rosin, tall oil rosin, and wood rosin, wherein the amino alcohol is at least one amino alcohol selected from the group consisting of ethanol amine, diethanol amine, triethanol amine, dimethyl ethanol amine, methyl diethanol amine, tri-n-propanol amine, triisopropanol amine, isobutyl diethanol amine, and n-butyl diethanol amine, and functions to prevent ester and amide formation, and wherein the air entraining agent has a form selected from the group consisting of a solid, an aqueous solution, an aqueous colloidal suspension, and an aqueous dispersion.

2. The air entraining agent according to claim 1, wherein the rosin comprises modified rosin which is at least one reinforced rosin comprised of at least one α, β-unsaturated carbonyl compound present in an amount effective to reinforce the at least one reinforced rosin.

3. The air entraining agent according to claim 2, wherein the at least one α, β-unsaturated carbonyl compound in present in an amount ranging from 1 to 30 weight % based on the total weight of the modified rosin.

4. The air entraining agent according to claim 3, wherein the at least one α, β-unsaturated carbonyl compound in present in an amount ranging from 5 to 25 weight % based on the total weight of the modified rosin.

5. The air entraining agent according to claim 1, wherein the rosin comprises modified rosin which a disproportionation product of at least one rosin which has been disproportionated by subjecting the at least one rosin to one of:

(a) a temperature effective to disproportionate the at least one rosin or (b) a disproportionating catalyst.

6. The air entraining agent according to claim 5, wherein the temperature effective to disproportionate the at least one rosin ranges from 160° to 300° C.

7. The air entraining agent according to claim 6, wherein the temperature effective to disproportionate the at least one rosin ranges from 200° to 250° C.

8. The air entraining agent according to claim 5, wherein the disproportionating catalyst is 5% Pd on activated charcoal.

9. The air entraining agent according to claim 1, wherein the rosin comprises modified rosin which is one of:

(a) at least one reinforced rosin containing a reinforcing agent comprised of at least one α, β-unsaturated carbonyl compound, (b) a disproportionation product of at least one rosin which has been disproportionated by subjecting the at least one rosin to one of:
  (i) a temperature effective to disproportionate the at least one rosin or
  (ii) a disproportionating catalyst, or (c) a mixture of (a) and (b).

10. The air entraining agent according to claim 9, wherein the temperature effective to disproportionate the at least one rosin ranges from 160° to 300° C.

11. The air entraining agent according to claim 10, wherein the temperature effective to disproportionate the at least one rosin ranges from 200° to 250° C.

12. The air entraining agent according to claim 9, wherein the disproportionating catalyst is 5% Pd on activated charcoal.

13. The air entraining agent according to claim 1, wherein the amino alcohol is present in an amount ranging from 3 to 30 weight %.

14. The air entraining agent according to claim 1, wherein the air entraining agent has the form of an aqueous dispersion, and wherein the aqueous dispersion further comprises a stabilizing agent which is at least one surfactant selected from the group consisting of anionic surfactants, cationic surfactants, and non-ionic surfactants and which is present in an amount effective to stabilize the aqueous dispersion.

15. The air entraining agent according to claim 1, wherein the air entraining agent includes water of high hardness, and wherein the air entraining agent has a form which is stable.

16. A process for providing air entrainment in a composition which contains cement and which is one of mortar or concrete, comprising:

providing the air entraining agent according to claim 1; and incorporating an effective amount of the air entraining agent into the composition to thereby provide the composition with air entrainment.

17. The process according to claim 16, wherein from 0.001 to 0.1 weight % of the air entraining agent is incorporated into the composition based on the weight of the cement.

18. The process according to claim 16, wherein the air entraining agent includes water of high hardness, and wherein the air entraining agent has a form which is stable.

* * * * *